United States Patent [19]

Ohkubo et al.

[11] 3,909,539

[45] Sept. 30, 1975

[54] FOUR-CHANNEL STEREOPHONIC DEMODULATING SYSTEM

[75] Inventors: Tuneo Ohkubo, Katano; Yoshio Horiike, Neyagawa, both of Japan

[73] Assignee: Matsushita Electric Industrial Co., Ltd., Kadoma, Japan

[22] Filed: Sept. 19, 1973

[21] Appl. No.: 398,849

[30] Foreign Application Priority Data

Sept. 29, 1972 Japan .............................. 47-98518

[52] U.S. Cl. ........................................ 179/15 BT

[51] Int. Cl.² ........................................ H04H 5/00

[58] Field of Search ..... 179/15 BT, 1 GQ, 100.4 ST

[56] References Cited

UNITED STATES PATENTS

| | | | |
|---|---|---|---|
| 3,167,615 | 1/1965 | Wilhelm | 179/15 BT |
| 3,296,378 | 1/1967 | Fish | 179/15 BT |
| 3,306,981 | 2/1967 | Hecht | 179/15 BT |
| 3,308,241 | 3/1967 | Todokoro | 179/15 BT |
| 3,309,464 | 3/1967 | Pietrolewicz | 179/15 BT |
| 3,479,463 | 11/1969 | Dias | 179/15 BT |
| 3,707,603 | 12/1972 | Limberg | 179/15 BT |
| 3,708,623 | 1/1973 | Dorren | 179/15 BT |
| 3,721,766 | 3/1973 | Hilbert | 179/15 BT |

*Primary Examiner*—Kathleen H. Claffy
*Assistant Examiner*—Thomas D'Amico
*Attorney, Agent, or Firm*—Stevens, Davis, Miller & Mosher

[57] ABSTRACT

A four-channel stereophonic demodulating system having three switching circuits, the outputs of the first one of the switching circuits being applied to the second and third switching circuits respectively, whereby separated four signals are taken out from the output terminals of the second and third switching circuits. The input to at least one of said switching circuits is added to the output of said switching circuit, thereby adjusting the relative signal levels between the individual sub-channels.

5 Claims, 1 Drawing Figure

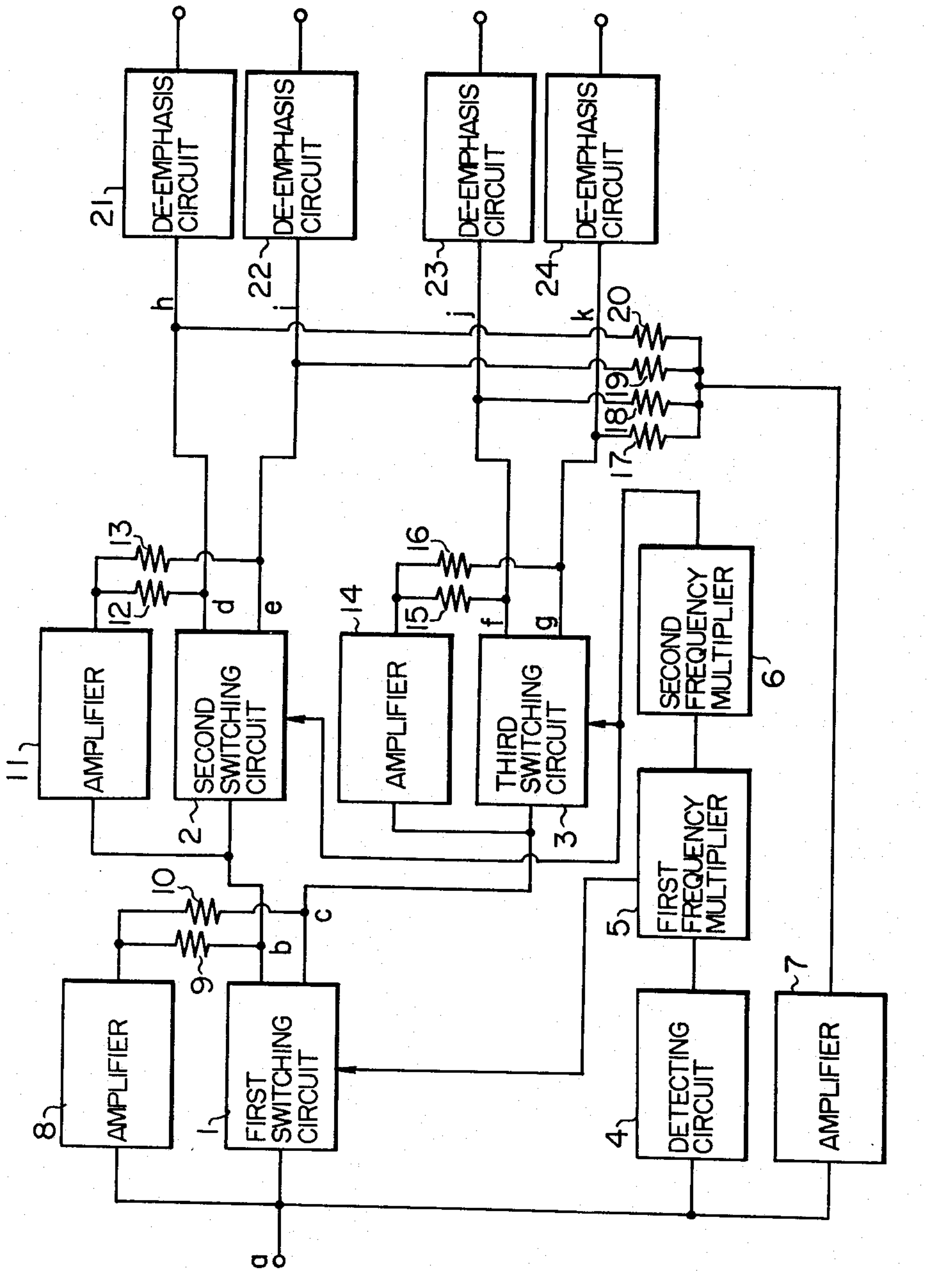
DE-EMPHASIS CIRCUIT
DE-EMPHASIS CIRCUIT
DE-EMPHASIS CIRCUIT
DE-EMPHASIS CIRCUIT
AMPLIFIER
SECOND SWITCHING CIRCUIT
AMPLIFIER
THIRD SWITCHING CIRCUIT
SECOND FREQUENCY MULTIPLIER
FIRST FREQUENCY MULTIPLIER
AMPLIFIER
FIRST SWITCHING CIRCUIT
DETECTING CIRCUIT
AMPLIFIER

FOUR-CHANNEL STEREOPHONIC DEMODULATING SYSTEM

This invention relates to four-channel stereophonic demodulating systems and, more particularly, to four-channel stereophonic demodulation systems having superior separation characteristics.

In four-channel stereophonic broadcasting systems it is well known to use a stereophonic composite signal represented by a modulation function $M(t)$ given as:

$$M(t) = A + B\sin\omega st + C\cos\omega st + D\sin 2\omega st + K\sin\tfrac{1}{2}\omega st \qquad 1.$$

where K is a constant, $\omega s/2\pi = 38$ kHz, $A = L_F + L_R + R_F + R_R$, $B = (L_F + L_R) - (R_F + R_R)$, $C = (L_F - L_R) - (R_F - R_R)$, $D = (L_F - L_R) + (R_F - R_R)$, $L_F$ is front left signal, $L_R$ is rear left signal, $R_F$ is front right signal, and $R_R$ is rear right signal.

The first term, A, shows a main channel signal component consisting of a first one of four different combinations of four stereophonically related signals; the second term, $B \sin \omega s t$, shows a first sub-channel signal component consisting of a signal resulting from carrier-suppressed amplitude modulation of a first sub-carrier wave; the third term, $C \cos \omega s t$, shows a second sub-channel signal component consisting of a signal resulting from carrier-suppressed amplitude modulation of a second sub-carrier wave; the fourth term, $D \sin 2 \omega s t$, shows a third sub-channel signal component consisting of a signal resulting from carrier-suppressed amplitude modulation of a third sub-carrier wave; and the fifth term, $K \sin \tfrac{1}{2} \omega s t$, shows a pilot signal component.

Since such a four-channel composite signal has to be transmitted in as narrow a band as possible, it is impossible to use a rectangular signal. Therefore, the separation should be improved in the receiver. Also, the levels of the individual channel inputs to the demodulator circuit are different due to characteristics of the four-channel transmission route (for instance, the tuner). Therefore, it is desired that the level adjustment between the individual channel signals be made in the demodulator circuit for adjusting the separation.

The invention has for its object to permit the aforementioned level adjustment in the demodulator circuit so that satisfactory separation can always be obtained even if the stereophonic composite signal is subject to variations of levels of the individual channels in the transmission route (for instance in the tuner circuit).

According to the invention, the relative signal levels of the individual channels can be readily adjusted for reducing cross-talk in the stereophonically related four signals appearing at output terminals of switching means.

The above and other objects, features and advantages of the invention will become more apparent from the following description when the same is read in connection with the accompanying drawing, which is a block diagram showing an embodiment of the four-channel stereophonic demodulating system according to the invention.

Referring to the drawing, indicated at *a* is a stereophonic composite signal input terminal. It is now assumed that a stereophonic composite signal impressed at this input terminal *a* has different levels for individual channels and is given as:

$$M(t) = A + K_1B\sin\omega st + K_2C\cos\omega st + K_3D\sin 2\omega st + K\sin\tfrac{1}{2}\omega st \ldots \qquad 2.$$

where $K_1$, $K_2$ and $K_3$ are constants.

The stereophonic composite signal appearing at the input terminal *a* and given by equation 2 is applied to a first switching circuit 1, a 19-kHz detecting circuit 4, and amplifier circuits 7 and 8. The 19-kHz detecting circuit 4 selectively passes only a pilot signal (the fifth terms in equation 2) in the stereophonic composite signal. The pilot signal derived here is converted into a 38-kHz signal in a first frequency multiplier circuit 5, whose output is then converted into a 76-kHz signal in a second frequency multiplier circuit 6. The stereophonic composite signal added to the first switching circuit 1 is switched with the 38-kHz signal obtained at the first frequency multiplier circuit 5, so that signals $P_1M(t)$ and $Q_1M(t)$ appear at output terminals of the first switching circuit, (where $P_1$ and $Q_1$ are switching functions.) Meanwhile, the composite signal $M(t)$ is amplified through the amplifier circuit 8, whose output is coupled through resistors 9 and 10, from which a signal $(\alpha/2)M(t)$ ($\alpha \geqslant 0$ or $\alpha < 0$) is added to the output terminals *b* and *c*. Thus, at the output terminals *b* and *c* there appear signals respectively given as:

$$\text{terminal } b; \quad \left(P_1 + \frac{\alpha}{2}\right) M(t) \qquad \ldots\ldots\ldots\ldots\ldots(3)$$

$$\text{and terminal } c; \quad \left(Q_1 + \frac{\alpha}{2}\right) M(t) \qquad \ldots\ldots\ldots\ldots\ldots(4)$$

These signals are respectively applied to second and third switching circuits 2 and 3 and are switched therein with the 76-kHz signal obtained at the second frequency multiplier circuit 6. Here, switching functions are $P_2$, $Q_2$. Meanwhile, the signals:

$$\left(P_1 + \frac{\alpha}{2}\right) M(t)$$

and $$\left(Q_1 + \frac{\alpha}{2}\right) M(t)$$

are amplified through respective amplifier circuits 11 and 14. The outputs of the amplifier circuit 11 are coupled through respective resistors 12, 13 to the outputs *d* and *e*, and the outputs of the amplifier circuit 14 are coupled through respective resistors 15 and 16 to the outputs *f*, *g*, so that either signal $$\frac{\beta}{2}\left(P_1 + \frac{\alpha}{2}\right)M(t) \text{ or } \frac{\beta}{2}\left(Q_1 + \frac{\alpha}{2}\right)M(t) \quad (\beta \geqq 0 \text{ or } \beta < 0)$$

is added to output terminals *d, e, f* and *g*. Thus the low frequency components derived from the output terminals *d, e, f* and *g* are respectively given as $$\text{terminal d;} \quad \left(P_1 + \frac{\alpha}{2}\right)\left(P_2 + \frac{\beta}{2}\right) M(t)$$

-Continued $$= \tfrac{1}{4}(1+\alpha)(1+\beta)A + \frac{1}{2\pi}(1+\beta)K_1B + \frac{1}{2\pi}K_2C + \frac{1}{2\pi}(1+\alpha)K_3D \quad \ldots\ldots (5)$$

terminal e;

$$\left(P_1 + \frac{\alpha}{2}\right)\left(Q_2 + \frac{\beta}{2}\right)M(t)$$

$$= \tfrac{1}{4}(1+\alpha)(1+\beta)A + \frac{1}{2\pi}(1+\beta)K_1B - \frac{1}{2\pi}K_2C - \frac{1}{2\pi}(1+\alpha)K_3D \quad \ldots\ldots (6)$$

terminal f;

$$\left(Q_1 + \frac{\alpha}{2}\right)\left(P_2 + \frac{\beta}{2}\right)M(t)$$

$$= \tfrac{1}{4}(1+\alpha)(1+\beta)A - \frac{1}{2\pi}(1+\beta)K_1B - \frac{1}{2\pi}K_2C + \frac{1}{2\pi}(1+\alpha)K_3D \quad \ldots\ldots (7)$$

and terminal g;

$$\left(Q_1 + \frac{\alpha}{2}\right)\left(Q_2 + \frac{\beta}{2}\right)M(t)$$

$$= \tfrac{1}{4}(1+\alpha)(1+\beta)A - \frac{1}{2\pi}(1+\beta)K_1B + \frac{1}{2\pi}K_2C - \frac{1}{2\pi}(1+\alpha)K_3D \quad \ldots (8)$$

$$\text{where } P_1 \text{ or } Q_1 = \tfrac{1}{2} \pm \frac{2}{\pi}\sin\omega st \pm \frac{2}{3\pi}\sin 3\omega st \pm \quad \ldots (9)$$

$$\text{and } P_2 \text{ or } Q_2 = \tfrac{1}{2} \pm \frac{2}{\pi}\sin 2\omega st \pm \frac{2}{3\pi}\sin 6\omega st \pm \quad \ldots (10)$$

By setting the constants in equations 5 to 8 such that they satisfy a relation $$(1+\beta)K_1 = K_2 = (1+\alpha)K_3 \qquad 11.$$

it is possible to make equal the levels of the individual sub-channel signals.

From equation 11 we have:

$$\alpha = \frac{K_2 - K_3}{K_3}$$

$$\text{and} \quad \beta = -\frac{K_1 - K_2}{K_1} \quad \ldots\ldots (12)$$

Meanwhile the stereophonic composite signal impressed upon the input terminal *a* is amplified through the amplifier circuit 7, whose output is applied through resistors 17 to 20 so as to add a signal $$-\frac{1}{4}\left\{(1+\alpha)(1+\beta) - \frac{2}{\pi}K_2\right\}M(t) \quad \ldots (13)$$

to output terminals *h*, *i*, *j* and *k*. It is possible to make equal the levels between main channel and subchannel. Thus, perfectly separated outputs are obtained from the respective output terminals *h*, *i*, *j* and *k*. That is, the outputs at terminals *h*, *i*, *j* and *k* are $L_F$, $L_R$, $R_F$ and $R_R$ respectively.

Numerals 21 to 24 designate de-emphasis circuits.

While in the above embodiment an amplifier circuit is provided for each of the first to third switching circuits, the amplifier may be provided only for the first switching circuit. In such a case, $K_1$ and $K_2$ of equation 2 are not equal.

Also, while in the above embodiment use has been made of first and second switching functions of equations 9 and 10, other switching functions may also be used. For example, the first and second switching functions may be interchanged. Also, it is possible to use as the first switching function the one given by equation 9 and as a second switching function given as $$P_2 \text{ or } Q_2 = \frac{1}{2} \pm \frac{2}{\pi}\cos\omega st \mp \frac{2}{3\pi}\cos 3\omega st \pm \quad \ldots (14)$$

In this case, $\alpha$ and $\beta$ are represented as follows:

$$\alpha = \frac{K_3 - K_2}{2K_2}$$

$$\beta = \frac{K_3 - K_1}{2K_1}$$

and corresponding levels between each sub-channel can be adjusted.

Further, while in the above embodiment the third sub-channel signal has been DSB, the same effects may be obtained where the third subchannel signal is SSB.

Furthermore, the factor C in the third term and factor D in the fourth term in equation 2 may be interchanged. Moreover, while the above embodiment has concerned with the case of compensating for level changes in the transmission route, the invention may also be employed for compensating for level changes due to characteristics of individual switching circuits constituting the demodulating system.

What we claim is:

1. A four-channel stereophonic demodulating system for demodulating a four-channel stereophonic composite signal containing a main channel signal component constituted by a first one of four different combinations of signals, said combinations of signals being obtained from four signals stereophonically related to one another, a first subchannel signal component obtained through suppressed-carrier amplitude modulation of a second one of said combinations of signals on a first subcarrier wave, a second subchannel signal component obtained through suppressed-carrier amplitude modulation of a third one of said combinations of signals on a second subcarrier wave 90° out of phase with respect to said first subcarrier wave, a third subchannel signal component obtained through suppressed-carrier amplitude modulation of a fourth one of said combinations of signals on a third subcarrier wave at double the frequency of said first and second subcarrier waves, at least one of said subchannel signal components having a level different from the levels of the other subchannel signal components, and a pilot signal having a frequency one half of said first subcarrier wave, said demodulating system comprising:

means for producing a first switching signal at a harmonic frequency of said pilot signal;

means for producing a second switching signal at another harmonic frequency of said pilot signal;

a first switching circuit supplied with said four-channel stereophonic composite signal and operated by said first switching signal for producing a pair of output signals from the supplied composite signal;

second and third switching circuits operated by said second switching signal for producing four audio signals at their output terminals from the supplied output signals of said first switching circuit;

means for supplying the outputs of said first switching circuit to said second and third switching circuits;

means for deriving said four audio signals from the outputs of said second and third switching circuits; and means adding the signal at the input of each of said switching circuits to the output thereof to obtain level adjustments between the first, second and third subchannel signal components.

2. A four-channel stereophonic demodulating system for demodulating a four-channel stereophonic composite signal containing a main channel signal component constituted by a first one of four different combinations of signals, said combinations of signals being obtained from four signals stereophonically related to one another, a first subchannel signal component obtained through suppressed-carrier amplitude modulation of a second one of said combinations of signals on a first subcarrier wave, a second subchannel signal component obtained through suppressed-carrier amplitude modulation of a third one of said combinations of signals on a second subcarrier wave 90° out of phase with respect to said first subcarrier wave, a third subchannel signal component obtained through suppressed-carrier amplitude modulation of a fourth one of said combinations of signals on a third subcarrier wave at double the frequency of said first and second subcarrier waves, at least one of said subchannel signal components having a level different from the levels of the other subchannel signal components, and a pilot signal having a frequency one half of said first subcarrier wave, said demodulating system comprising:

means for producing a first switching signal at a harmonic frequency of said pilot signal;

means for producing a second switching signal at another harmonic frequency of said pilot signal;

a first switching circuit supplied with said four-channel stereophonic composite signal and operated by said first switching signal for producing a pair of output signals from the supplied composite signal;

second and third switching circuits operated by said second switching signal for producing four audio signals at their output terminals from the supplied output signals of said first switching circuit;

means for supplying the outputs of said first switching circuit to said second and third switching circuits;

means for deriving said four audio signals from the outputs of said second and third switching circuits;

means adding the signal at the input of at least one of said switching circuits to the output thereof to obtain a lèvel adjustment between at least two of the first, second and third subchannel signal components; and means adding said four-channel stereophonic comosite signal at least including the main channel component to the outputs of the second and third switching circuits.

3. A four-channel stereophonic demodulating system according to claim 2, wherein the input signal to the first switching circuit is added to the outputs of the first switching circuit for obtaining a level adjustment between two of the first, second and third subchannel components, and the input signals to the second and third switching circuits are respectively added to the outputs of the second and third switching circuits for obtaining a level adjustment between another two of the first, second and third subchannel components.

4. A four-channel stereophonic demodulating system for demodulating a four-channel stereophonic composite signal containing a main channel signal component constituted by a first one of four different combinations of signals, said combinations of signals being obtained from four signals stereophonically related to one another, a first subchannel signal component obtained through suppressed-carrier amplitude modulation of a second one of said combinations of signals on a first subcarrier wave, a second subchannel signal component obtained through suppressed-carrier amplitude modulation of a third one of said combinations of signals on a second subcarrier wave 90° out of phase with respect to said first subcarrier wave, a third subchannel signal component obtained through suppressed-carrier amplitude modulation of a fourth one of said combinations of signals on a third subcarrier wave at double the frequency of said first and second subcarrier waves, at least one of said subchannel signal components having a level different from the levels of the other subchannel signal components, and a pilot signal having a frequency one half of said first subcarrier wave, said demodulating system comprising:

means for producing a first switching signal at a harmonic frequency of said pilot signal;

means for producing a second switching signal at another harmonic frequency of said pilot signal;

a first switching circuit supplied with said four-channel stereophonic composite signal and operated by said first switching signal for producing a pair of output signals from the supplied composite signal;

second and third switching circuits operated by said second switching signal for producing four audio signals at their output terminals from the supplied output signals of said first switching circuit;

means for supplying the outputs of said first switching circuit to said second and third switching circuits;

means for deriving said four audio signals from the outputs of said second and third switching circuits; and means adding the signal at the input of each of said switching circuits to the output thereof for level adjustment of the subchannel signal components relative to one another, said subchannel level adjusting adding means including first and second means, said first means adjusting the levels between said second and third subchannel signal components at the outputs of the first switching circuit when said first and second switching signals are at the frequencies of the first and third subcarrier signals, and said second means adjusting the levels between the first and second subchannel signal components at the outputs of the second and third switching circuits when said first and second switching signals are at the frequencies of the first and third subcarrier signals.

5. A four-channel stereophonic demodulating system for demodulating a four-channel stereophonic composite signal containing a main channel signal component constituted by a first one of four different combinations of signals, said combinations of signals being obtained from four signals stereophonically related to one another, a first subchannel signal component obtained through suppressed-carrier amplitude modulation of a second one of said combinations of signals on a first subcarrier wave, a second subchannel signal component obtained through suppressed-carrier amplitude modulation of a third one of said combinations of signals on a second subcarrier wave 90° out of phase with respect to said first subcarrier wave, a third subchannel signal component obtained through suppressed-carrier amplitude modulation of a fourth one of said combinations of signals on a third subcarrier wave at double the frequency of said first and second subcarrier waves, at least one of said subchannel signal components having a level different from the levels of the other subchannel signal components, and a pilot signal having a frequency one half of said first subcarrier wave, said demodulating system comprising:

means for producing a first switching signal at a harmonic frequency of said pilot signal;

means for producing a second switching signal at another harmonic frequency of said pilot signal;

a first switching circuit supplied with said four-channel stereophonic composite signal and operated by said first switching signal for producing a pair of output signals from the supplied composite signal;

second and third switching circuits operated by said second switching signal for producing four audio signals at their output terminals from the supplied output signals of said first switching circuit;

means for supplying the outputs of said first switching circuit to said second and third switching circuits;

means for deriving said four audio signals from the outputs of said second and third switching circuits; and means adding the signal at the input of each of said switching circuits to the output thereof for level adjustment of the subchannel signal components relative to one another, said subchannel level adjusting adding means including a first and second means, said first means adjusting the levels between said second and third subchannel signal components at the outputs of the first switching circuit when said first and second switching signals are at the frequencies of the first and second subcarrier signals, and said second means adjusting the levels between the first and third subchannel signal components at the outputs of the second and third switching circuits when said first and second switching signals are at the frequencies of the first and second subcarrier signals.

* * * * *